(12) United States Patent
Zine

(10) Patent No.: US 8,397,672 B2
(45) Date of Patent: Mar. 19, 2013

(54) PET BED TUNNEL DEVICE

(75) Inventor: Rita Zine, San Rafael, CA (US)

(73) Assignee: Worldwise, Inc., San Rafael, CA (US)

( * ) Notice: Subject to any disclaimer, the term of this patent is extended or adjusted under 35 U.S.C. 154(b) by 758 days.

(21) Appl. No.: 12/368,494

(22) Filed: Feb. 10, 2009

(65) Prior Publication Data

US 2010/0199917 A1 Aug. 12, 2010

(51) Int. Cl.
*A01K 29/00* (2006.01)

(52) U.S. Cl. .......................... 119/28.5; 119/491; 119/498

(58) Field of Classification Search ................ 119/28.5, 119/416, 491, 498, 499
See application file for complete search history.

(56) References Cited

U.S. PATENT DOCUMENTS

| | | | | |
|---|---|---|---|---|
| 1,879,473 A * | 9/1932 | Pitts | ............................. | 119/482 |
| 2,032,248 A * | 2/1936 | Bins | ............................. | 119/482 |
| 2,854,948 A * | 10/1958 | Drayson | ....................... | 119/482 |
| 3,066,646 A * | 12/1962 | Bramley | ....................... | 119/526 |
| 4,008,687 A * | 2/1977 | Keys | ............................. | 119/482 |
| 4,729,343 A * | 3/1988 | Evans | ............................. | 119/482 |
| 4,893,586 A * | 1/1990 | Carson | ........................... | 119/482 |
| 5,000,116 A * | 3/1991 | Fife et al. | ..................... | 119/28.5 |
| 5,010,843 A * | 4/1991 | Henry | ........................... | 119/28.5 |
| 5,072,694 A * | 12/1991 | Haynes et al. | ................ | 119/482 |
| 5,136,981 A * | 8/1992 | Barreto et al. | ............... | 119/28.5 |
| 5,226,384 A * | 7/1993 | Jordan | ........................... | 119/28.5 |
| D368,335 S * | 3/1996 | St. John | ........................ | D30/118 |
| 5,662,065 A * | 9/1997 | Bandimere et al. | .......... | 119/28.5 |
| 5,749,314 A * | 5/1998 | Pelham et al. | ............... | 119/28.5 |
| 5,826,537 A * | 10/1998 | Heilborn | ....................... | 119/28.5 |
| 6,196,156 B1 * | 3/2001 | Denesuk et al. | ............. | 119/28.5 |
| D441,146 S * | 4/2001 | Passmore | ..................... | D30/118 |
| 6,378,456 B1 * | 4/2002 | Jerome | ........................ | 119/28.5 |
| 7,373,900 B2 * | 5/2008 | Duncan | ........................ | 119/28.5 |
| 2006/0266294 A1 * | 11/2006 | Holmes et al. | ............... | 119/28.5 |
| 2008/0066686 A1 * | 3/2008 | Lockwood et al. | .......... | 119/28.5 |

* cited by examiner

*Primary Examiner* — David Parsley
(74) *Attorney, Agent, or Firm* — Bay Area Technology Law Group PC

(57) ABSTRACT

A pet bed having a base and a plush pad within the base which is sized to support a pet thereon. A tubular member is provided having one end affixed to the base and a non-rigid side wall, the non-rigid side wall being extendable from the base in a first orientation forming a tunnel from the plush pad and collapsible in a second orientation creating a side wall to the base.

3 Claims, 1 Drawing Sheet

PET BED TUNNEL DEVICE

TECHNICAL FIELD

A pet bed having a base and a plush pad within the base which is sized to support a pet thereon. A tubular member is provided having one end affixed to the base and a non-rigid side wall, the non-rigid side wall being extendable from the base in a first orientation forming a tunnel from the plush pad and collapsible in a second orientation creating a side wall to the base.

BACKGROUND OF THE INVENTION

Domestic pets, particularly cats, have certain needs which, if left unfulfilled, can result in irritability, depression and can even result in more severe physical and emotional problems. For example, cats require a soft and cushioned surface upon which to lounge and relax. To that end, the pet product arena is populated with numerous versions of pet beds many of which have plush pads and soft cushioning materials to promote sleep and relaxation.

Domestic cats also require a space or territory where they can feel safe. Cats oftentimes seek out shelters and the like for seclusion and, again, the pet product arena provides numerous shelters and "cat condos" for satisfying this need.

In addition, cats have a natural need to hunt as these animals are, by nature, predatory. Cats can be observed transversing surfaces stealthily in doing so. A need exists for a pet product to provide such a surface.

Although there are pet products, as noted above, which are capable of satisfying a number of individual feline needs, it has now been recognized that several of these needs can be satisfied by a single product which is capable of assuming multiple orientations not only to satisfy the needs of a pet as circumstances require but also to provide a rather compact collapsible structure in order to minimize shipping and warehousing costs. As to these latter issues, it is generally the case that products of this nature are produced at offshore locations where labor costs are relatively low. The products thus must be containerized and brought to the U.S. resulting in shipping being a significant factor in costing a product. Similarly, retailers oftentimes charge their suppliers for shelf space in displaying products to the public. Reducing such space again can directly result in cost savings.

It is thus an object of the present invention to provide a pet product capable of satisfying multiple needs of a domestic cat.

A further object of the present invention is to provide a pet bed which includes an extendible tubular member capable of providing rest, relaxation and seclusion while meeting the predatory needs of a domestic cat.

These and further objects will be more readily apparent when considering the following disclosure and appended claims.

SUMMARY OF THE INVENTION

A pet bed having a base and a plush pad within the base which is sized to support a pet thereon. A tubular member is provided having one end affixed to the base and a non-rigid side wall, the non-rigid side wall being extendable from the base in a first orientation forming a tunnel from the plush pad and collapsible in a second orientation creating a side wall to the base.

DETAILED DESCRIPTION OF THE INVENTION

Figure 1:
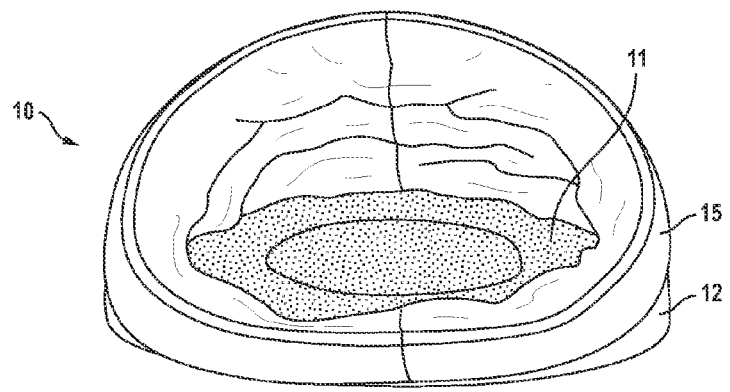
FIG. 1 is a front perspective view of the pet bed of the present invention.

Turning first to FIG. 1, pet bed 10 is depicted having base 12 for retaining plush pad 11 sized to receive a domestic cat. Base 12 can be fabricated from rigid or semi-rigid material such as plastic, metal, wood or stuffing materials such as plastics, foam or batting. Generally, such materials are contained within an outer plush fabric covering to enhance aesthetics and to prevent pet injuries as well as to resist degradation resulting from a cat's general need to scratch.

Figures 2A, 2B:
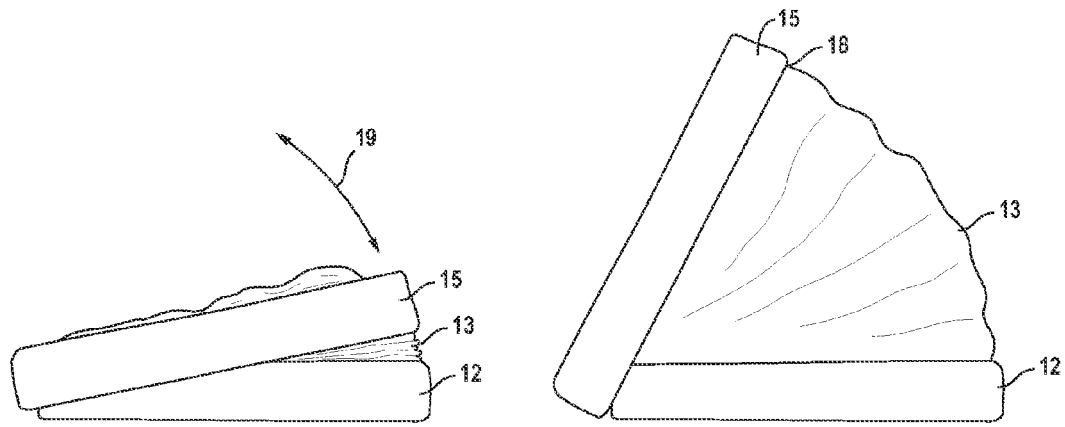
FIGS. 2A and 2B are directed to side views of the pet bed of FIG. 1 in both collapsed and extended orientations.

When the present invention is in the form of the collapsed structure of FIG. 2A, tubular member 13 is folded down compactly atop base 12 much as a convertible top is collapsed against the rear deck of an automobile. Rigid or semi-rigid hoop 15 is affixed to end 18 of tubular member 13 in order to retain the tunnel shape of tubular member 13 particularly when hoop 15 is drawn away from base 12 as depicted in FIG. 2B. Again, this would be akin to raising a convertible top from the rear deck of an automobile in order to cover the passenger compartment thereof.

It should be quite apparent from a review of FIGS. 2A and 2B that tubular member 13 must have certain characteristics which enable it to function in the present environment. Specifically, tubular member 13 must be able to somewhat compactly nest upon base 12 as hoop 15 is raised and lowered in the direction of arrow 19. Further, tubular member 13 must be of a nature to remain extended in the orientation of FIG. 2B without collapsing upon itself or assuming the FIG. 2A orientation.

Figure 3:
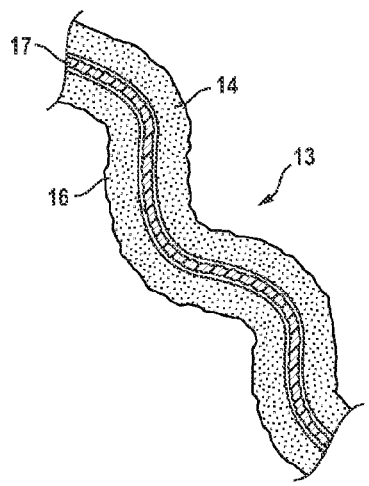
FIG. 3 is a cross-sectional view of a portion of the tubular member constituting the present invention as a depiction of a preferred embodiment thereof.

The goals of the present invention can be achieved by constructing tubular member 13 from one or more layers of plush fabric together with a rigidizing membrane as depicted in FIG. 3.

Ideally, tubular member 13 is constructed of plush fabric layers 14 and 16 providing a nurturing surface to the domestic cat engaging the present invention. As a preferred embodiment, plush fabric layers 14 and 16 sandwich a relatively brittle layer 17. Layer 17 is ideally a sheet of Mylar® (polyethylene terephthalate).

Turning again to FIG. 3, it is noted that Mylar® layer 17 is intended to satisfy several requirements of the present invention. As noted above, it acts as a rigidifying membrane enabling tubular member 13 to assume the orientations depicted in both FIGS. 2A and 2B. When assuming the orientation of FIG. 2B, rigid hoop 15 ensures that tubular member 13 retains its tunnel-like shape. In addition, when walked upon by a domestic cat, Mylar® membrane 17 creates a crinkle feel and sound. This enhances a cat's sense of hunting as the cat attempts to walk upon tubular member 13 stealthily.

In summary, the present invention, in a single collapsible, compact and aesthetically pleasing form, satisfies a number of diverse needs of a domestic cat. Firstly, plush pad 11 provides comfort and nurturing resulting in a relaxing environment. Secondly, when tubular member is extended (FIG. 2B), a tunnel is created between base 12 and rigid hoop 15 providing a pet with a secluded space. Thirdly, by incorporating a brittle membrane (FIG. 3) in the construction of tubular member 13, a surface is created that crinkles underfoot thus satisfying the hunting extinct of the pet.

It should be readily apparent that the above discussion was directed to the preferred embodiment to the present invention but that other embodiments can be considered as well, the scope of the present invention being limited only by the appended claims. For example, it is preferred that tubular member 13 be affixed to base 12. However, tubular member 13 could be removable therefrom for cleaning, shipping and storage. Thus, tubular member 13 could be zippered, snapped or connected by hook and loop fasteners to base 12 as desired. Further, Mylar® membrane 17 discussed above could be replaced by other membranes such as other plastics, metal foils and the like in performing a similar function.

What is claimed is:

1. A pet bed comprising a base, a plush pad within said base and sized to support a pet thereon, a tubular member having one end affixed to said base and a non-rigid side wall, said non-rigid side wall being extendable from said base in a first orientation forming a tunnel from said plush pad and collapsible in a second orientation creating a side wall to said base, and wherein said tubular member further comprises a rigid hoop configured within a second end thereof to maintain a tubular shape of said tubular member.

2. The pet bed of claim 1 wherein said tubular member comprises outer and inner fabric layers and located therebetween, a rigidifying membrane.

3. The pet bed of claim 2 wherein said rigidifying membrane comprises polyethylene terephthalate.

* * * * *